US006946816B2

United States Patent
Pfab et al.

(10) Patent No.: US 6,946,816 B2
(45) Date of Patent: Sep. 20, 2005

(54) METHOD AND SYSTEM FOR CONTROLLING THE CHARGING OF A VEHICLE BATTERY

(75) Inventors: Xaver Pfab, Isen (DE); Thomas Lang, Aufkirchen (DE)

(73) Assignee: Bayerische Motoren Werke, Munich (DE)

( * ) Notice: Subject to any disclaimer, the term of this patent is extended or adjusted under 35 U.S.C. 154(b) by 0 days.

(21) Appl. No.: 10/762,766

(22) Filed: Jan. 21, 2004

(65) Prior Publication Data

US 2004/0239289 A1 Dec. 2, 2004

Related U.S. Application Data

(63) Continuation of application No. PCT/EP02/06532, filed on Jun. 14, 2002.

(30) Foreign Application Priority Data

Jul. 21, 2001 (DE) .......................... 101 35 621

(51) Int. Cl.$^7$ ................................. H02J 7/00
(52) U.S. Cl. ..................................... 320/104
(58) Field of Search ............................. 320/104, 136; 307/10.7, 10.1; 322/28; 700/293

(56) References Cited

U.S. PATENT DOCUMENTS

| | | | | |
|---|---|---|---|---|
| 4,290,109 A | * | 9/1981 | Taniguchi et al. | 700/293 |
| 4,755,734 A | * | 7/1988 | Komurasaki et al. | 322/28 |
| 5,327,068 A | * | 7/1994 | Lendrum et al. | 320/136 |
| 5,416,702 A | | 5/1995 | Kitagawa et al. | 701/36 |

FOREIGN PATENT DOCUMENTS

| | | |
|---|---|---|
| DE | 3936638 | 3/1991 |
| DE | 4422329 | 1/1995 |
| GB | 2348057 | 9/2000 |

* cited by examiner

*Primary Examiner*—Pia Tibbits
(74) *Attorney, Agent, or Firm*—Crowell & Moring LLP

(57) ABSTRACT

A control of the charging of a vehicle battery by means of a generator is disclosed. The generator also supplies an electric on-board power supply of a motor vehicle and an additional consuming device with electric power. However, the additional consuming device is supplied with electric power only when the power demand of the on-board power supply has been met. The supplying of the additional consuming device and the charging of the vehicle battery are controlled as follows: When the power demand of the additional consuming device has not been completely met, when a charging current, which flows from the generator into the vehicle battery, is higher than a limit value, and when the generator power additionally permits the supplying of the additional consuming device, the additional consuming device is supplied with power by the generator, and the charging current is adjusted such that it is lower than the maximally possible charging current while the generator power and the power demand of the on-board power supply are the same.

27 Claims, 1 Drawing Sheet

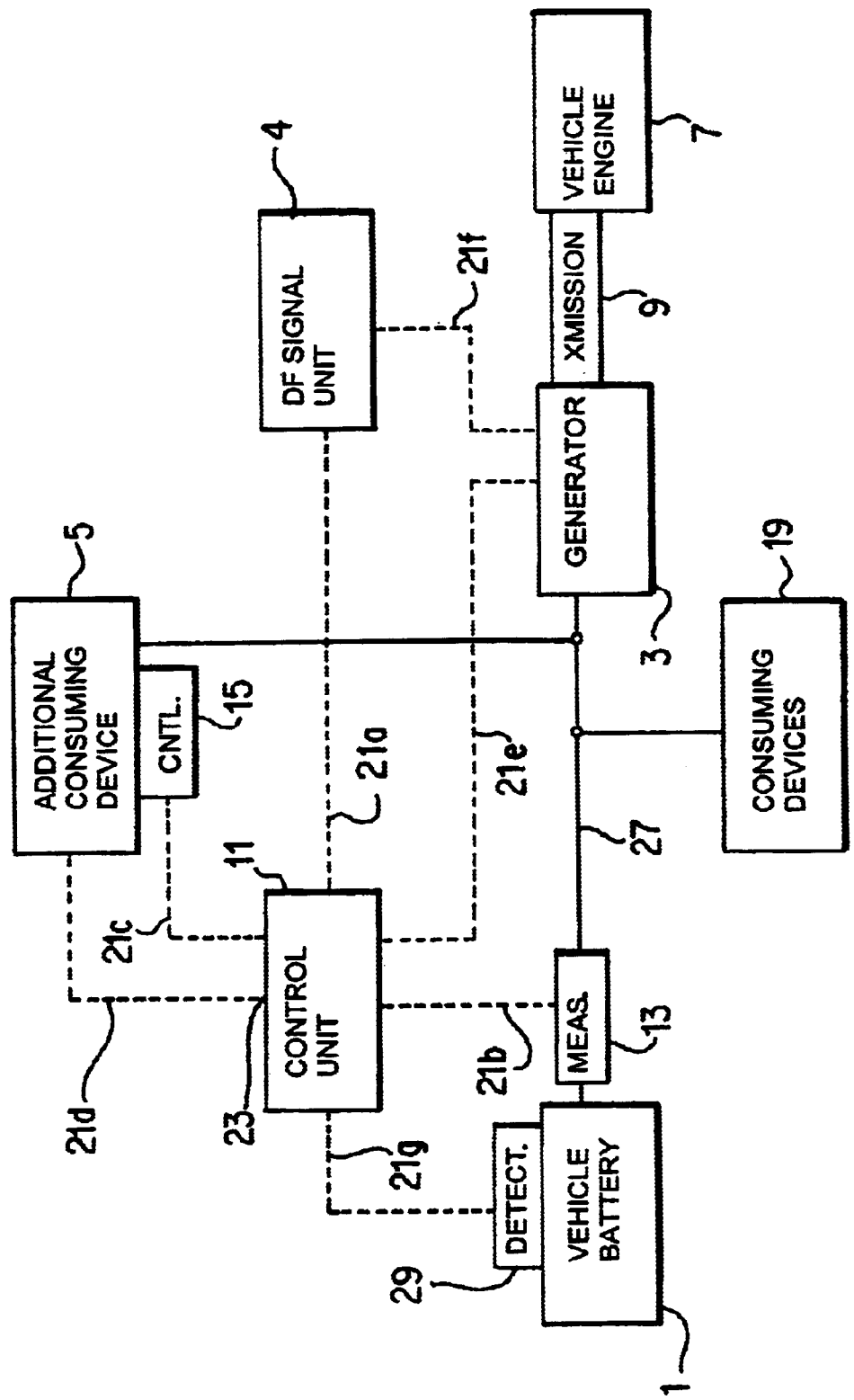

METHOD AND SYSTEM FOR CONTROLLING THE CHARGING OF A VEHICLE BATTERY

CROSS-REFERENCE TO RELATED APPLICATIONS

This application is a Continuation Application of International Patent Application No. PCT/EP02/06532 filed on Jun. 14, 2002, which, in turn, claims the benefit of German Patent Application DE 10135621.8-32 filed on Jul. 21, 2001.

BACKGROUND AND SUMMARY OF THE INVENTION

The invention relates to a method and a system for controlling the charging of a vehicle battery.

Electrical on-board power supplies of motor vehicles normally have a vehicle battery and a generator which is connected parallel thereto and continuously generates electric power when the engine is running. As a rule, the generator power is sufficient for supplying all consuming devices connected to the on-board power supply. The vehicle battery is therefore usually used only as an energy accumulator for the starting operation and for the short-term supply of the electrical consuming devices, for example, in the event of a brief engine stoppage. Particularly after a cold start, the vehicle battery should expediently be supplied with electric power by the generator until the vehicle battery is completely charged. Even afterwards, it can still be charged further at a low charging current in order to maintain the charged condition.

In the case of vehicles with internal-combustion engines, the vehicle interior is normally heated by using engine waste heat. However, in the warm-up phase after a cold start, internal-combustion engines emit only little heat. This applies particularly to high-efficiency internal-combustion engines, such as modern diesel engines.

It has therefore been suggested to operate an electrical auxiliary heater during the warm-up phase, which is supplied with power by an electrical on-board power supply. German Patent Document DE 197 28 589 C1 describes a system with such an auxiliary heater. In order to utilize the generator well, a so-called dynamo field signal (DF signal) is tapped which controls an exciting current of the generator and is a measurement for the utilization of the generator, and the generator utilization is regulated to a defined value by adapting the electric resistance of the auxiliary heater. During the operation of the auxiliary heater, the vehicle battery is permanently connected to the generator.

This approach has the disadvantage that the power offered to the auxiliary heater depends on the charging condition of the vehicle battery and on the power requirement of the electrical consuming devices on the on-board power supply, and an undersupply and/or heating capacity fluctuations may therefore occur which are noticed by the vehicle occupants. This particularly applies to systems with vehicle batteries having a high storage capacity which can be charged with very high charging currents, for example, currents of more than 150 A. In order to ensure a supplying of the auxiliary heater with electric power in such cases, generators have been used in practice which have a particularly high nominal generator power. However, such generators are heavy, are expensive with respect to their manufacturing and require a lot of space.

It is an object of the present invention to provide a method and a system which permit a good utilization of the generator, prevent a discharge of the vehicle battery, and nevertheless, even at normal nominal generator power and in warm-up phases, permit a supplying of an auxiliary consuming device with electric power which is as uniform as possible. The auxiliary consuming device is particularly an auxiliary electrical heater but may also be another consuming device which is provided in addition to other electrical consuming devices and which does not have to be supplied with electric power in a permanent manner and/or with priority. The generator supplies the additional consuming device with electric power only when the power requirement of the on-board power supply has been met.

An essential idea of the present invention is the adjusting of a charging current, by which the generator charges the vehicle battery, in such a manner that the charging current is lower than the maximally possible charging current while the generator power and the power requirement of the on-board power supply are the same. This adjustment will be made when it is determined that the charging current is greater than or equal to a limit value, when a power demand of the additional consuming device exists, and when the generator power permits a supplying of the additional consuming device. The charging current is preferably adjusted such that it does not fall below the limit value. This ensures a charging of the vehicle battery if required, particularly in a low charging condition of the vehicle battery.

One possibility of adjusting the charging current consists of providing a control element in a current path from the generator to the vehicle battery and of operating this control element such that the charging current is adjusted to a value lower than maximally possible.

The charging current is preferably indirectly adjusted in that an electric resistance of the additional consuming device is adjusted. German Patent Document DE 197 28 589 C1 describes two suitable variants which may also be combined. According to the first variant, the additional consuming device, in this case, the auxiliary heater, has a plurality of parallel-connected heating elements which can be switched on and off individually. According to the second variant, the auxiliary heater has a power transistor, such as a MOSFET (metal oxide semiconductor field effect transistor) whose heating resistance can be adjusted by controlling a control input of the transistor. As a result, on the one hand, a sufficient charging of the vehicle battery can be achieved and, on the other hand, because of the reduction of the charging current, in comparison to the maximally possible charging current, a more uniform supplying of the additional consuming device can be achieved. Furthermore, a generator with a lower nominal power can be used than when a power reserve has to be held for the event of high battery charging currents. On the whole, the generator is therefore better utilized.

In a further development, the utilization of the generator is still increased in that the charging current is increased when the power demand of the additional consuming device has been met to a certain degree, in particular, is fully met.

In an embodiment of the invention, the charging current is controlled, at least under the above-mentioned conditions, to the limit value. This means that it is attempted to achieve that the charging current is neither lower nor higher than the limit value. For example, because of dead times and/or inertias in the control circuit, the charging current may, however, deviate from the limit value. For example, the adjusting of the charging current, as described above in connection with German Patent Document DE 197 28 589 C1, takes place by adjusting the electric resistance of the additional consuming device.

However, the charging current can also be regulated to a higher value when and/or as long as the generator power is sufficient for this purpose and, in addition, also allows the supplying of the auxiliary consuming device.

Preferably, the additional consuming device will not be supplied or no longer be supplied with electric power by the generator when the charging current is lower than the limit value and/or when the charging current falls below the limit value not only for a short time or not only because of a controlling of the charging current.

In a further development, a charging condition of the vehicle battery is detected and it is permitted that the charging current falls below the limit value and/or that the vehicle battery is discharged when a supply demand of the additional consuming device exists and when the charging condition reaches a high level, particularly, when a measurement for the charging condition is higher than or at least equal to a certain minimal value. In this case, when the charging condition is not critical, the additional consuming device can therefore nevertheless be supplied by the generator, although the generator power may, under certain circumstances, not be sufficient for simultaneously charging the vehicle battery by means of a charging current which is higher than the limit value. As a result, a still better coverage of the supply demand of the additional consuming device can be achieved and/or a generator with a lower nominal power can be used.

Preferably, the limit value is defined. In particular, the limit value is a function of at least one variable, perhaps of the vehicle battery temperature and/or the battery charging condition. For example, in the case of a higher energy amount accumulated in the battery, a lower limit value is defined. It is also possible to change the limit value as a function of the momentary generator power, in which case there is preferably no falling below a defined minimal limit value. However, if the battery is fully charged, there may be a falling below this minimal limit value.

It is suggested to analyze a demand signal which reflects the electrical supply demand of the additional consuming device, and to carry out the control of the charging of the vehicle battery described here as a function of the analyzing result. By means of the demand signal, a supplying of the additional consuming device with electric power is demanded.

In particular, the charging current is permitted to assume the highest possible value permitted by the momentary generator power, if there is no supply demand of the additional consuming device. As an alternative or in addition, the limit value of the charging current is adapted when the supply demand changes.

A generator is any type of device which generates electric power. The generator may, for example, be a conventional electromagnetic generator driven by an engine or may be a fuel cell. Also in the case of a fuel cell, a load condition or degree of utilization of the generator can be determined which can be analyzed and/or be used like the DF signal of a conventional generator.

BRIEF DESCRIPTION OF THE DRAWING

Embodiments of the invention will now be described by means of the attached drawings.

The single FIGURE is a schematic representation of an electric on-board power supply system of a motor vehicle with an additional consuming device connected thereto.

DETAILED DESCRIPTION OF THE DRAWING

The FIGURE shows a generator 3 which can be driven by way of a power transmission device 9 by a vehicle engine 7, for example, a diesel engine. A dynamo field signal (DF signal), which controls an exciting current of the generator 3 and from which the generator utilization can be derived, is tapped at a DF signal unit 4 and is supplied by way of a signal line 21$a$ to a control unit 11. The DF signal unit 4 is connected by way of a signal line 21$f$ with the generator 3. Additional details concerning the type and analysis of the DF signal are found in German Patent Document DE 197 28 589 C1.

Furthermore, the rotational speed of the generator 3 is determined, for example, directly tapped at the generator 3, or determined indirectly from the rotational speed of the vehicle engine 7, and transmitted to the control unit 11 by way of a signal line 21$e$.

By means of solid lines, the FIGURE shows a portion of the electric on-board power supply of a motor vehicle. Consuming devices 19, which are not shown in detail, such as heater plugs of the vehicle engine 7 and electronic control units for controlling engine functions or other functions of the motor vehicle, are supplied with electric power by the generator 3 and, under certain circumstances, by a vehicle battery connected parallel thereto. At least some of the consuming devices 19 carry out functions essential to the driving of the motor vehicle and/or to the safety, and are therefore supplied at a higher priority. When the vehicle engine 7 is running, the generator 3, as a rule, alone carries out the supplying of the consuming devices 19 and simultaneously charges the vehicle battery 1.

An additional consuming device 5, here, an auxiliary heater, is electrically connected with the generator 3. It is used for heating a vehicle interior when sufficient engine waste heat is not available for the heating.

In a current path 27, by way of which the generator 3 is connected with the vehicle battery 1, a measuring component 13 is situated for measuring the charging current by means of which the generator 3 charges the vehicle battery 1. The measuring component 13 is connected with the control unit 11 by way of a signal line 21$b$. Furthermore, a control element 15 is provided which is connected with the control unit by way of a signal line 21$c$ and which is used for adjusting the charging current. The control element 15 adjusts, for example, the electric resistance of the additional consuming device 5.

As an alternative, the control element may be provided, for example, in the current path 27 and may be particularly suitable to directly adjust the current, perhaps by a repeated brief interruption of the current flow, so that the mean current has the desired value over a time interval of, for example, one second. Another possibility of directly adjusting the charging current consists of the use of an adjustable dc converter. An input side of the converter, to which the input voltage is applied, is connected with the generator. An output side, to which an adjustable output voltage is applied, is connected with the vehicle battery. Particularly by adjusting the output voltage to a lower value than the input voltage, the charging current can be adjusted to a lower value than is possible when the generator power is the same.

The control unit 11 has a connection 23 to which a signal line 21$d$ is connected which connects the control unit 11 with the additional consuming device 5. By way of the signal line 21$d$, the additional consuming device 5 signals the extent of its supply demand and/or whether there is a supply demand.

A charging condition detector 29 is connected with the vehicle battery 1 and detects the charging condition of the vehicle battery 1, for example, indirectly by measuring the battery voltage. The charging condition detector 29 is connected by way of a signal line 21g with the control unit 11. The control unit 11 controls the charging of the vehicle battery as a function of a signal which it receives from the charging condition detector 29.

Now an algorithm will be described according to which the control unit, particularly the control unit 11 according to the FIGURE, can control the charging of the vehicle battery. Preferably, the control unit has an microelectronic processor for this purpose which repeatedly processes the individual steps of the algorithm.

At the beginning, the limit value of the charging current is defined, possibly as a function of variables, such as the electric voltage of the vehicle battery which is a measurement of the charging condition. Subsequently, an actual measuring value of the charging current and the DF signal are read in. If no supply demand of the additional consuming device exists, or at least one of the conditions described in the following has not been met, these steps are repeated at brief time intervals. If a supply demand exists, it is checked whether the DF signal corresponds to a lower utilization of the generator than a utilization limit value, for example, 95%. If this is the case, a controlling of the charging current is permitted, or, when the controlling is already activated, it is not deactivated. Otherwise, the controlling is not permitted or deactivated when the utilization of the generator is equal to the utilization limit value or is larger than the utilization limit value.

Subsequently, it is checked whether the charging current is higher than the limit value of the charging current. If this is so, the controlling is activated or the controlling remains active. Otherwise, the controlling is deactivated or remains inactive.

In the case of possible variants of the algorithm, the above-described steps are carried out in a different sequence. However, it is ensured that the above-mentioned conditions are met when the charging current controlling is activated.

When the controlling is activated, the additional consuming device is supplied with electric power by the generator. The charging current is controlled to the limit value.

During the controlling, the above-mentioned steps are carried out repeatedly. In this case, the charging current is permitted to fall briefly, because of inertias and/or during dead times, below the limit value. However, if a continuous falling below the limit value is determined or one of the other conditions is no longer met, the controlling is deactivated and the additional consuming device is no longer supplied by the generator.

In a further development, it is checked during the controlling whether the supply demand of the additional consuming device is fully covered. If this is so, the charging current is adjusted such that it is higher than the momentary limit value. This preferably takes place such that the additional consuming device continues to be fully supplied or the supply demand is covered at least to a defined percentage. The increase of the charging current can be achieved particularly by a corresponding increase and/or a continuous adaptation of the limit value of the charging current.

During the controlling, the charging condition of the vehicle battery preferably continues to be analyzed and, in a high charging condition, particularly as described above, the charging current is permitted to fall under the limit value. One possibility is that of terminating the controlling; another possibility is that of reducing the limit value.

In addition to achieving the above-mentioned advantages, the invention also extends the service life of the vehicle battery since, during the controlling, the charging current is adjusted to lower values. Thus, high charging currents can be avoided which result in damage to the vehicle battery. Optionally, by means of the system according to the invention, the charging current can also be adjusted to a lower value (than possible at the same generator power), that is, can be limited, when the additional consuming device has no supply demand.

What is claimed is:

1. Method of controlling the charging of a vehicle battery, wherein the vehicle battery is connected with a generator, the generator supplies a consuming device of the vehicle and an additional consuming device with electric power, and the generator supplying the additional consuming device with electric power only when the power requirement of the consuming device has been met, wherein the supplying of the additional consuming device and the charging of the vehicle battery are controlled in that when the power demand of the additional consuming device is not fully met, when it is determined that a charging current, which flows from the generator into the vehicle battery, is higher than a limit value, and when the generator power additionally permits the supplying of the additional consuming device, the additional consuming device is supplied with power by the generator and the charging current is adjusted such that it is lower than the maximally possible charging current while the generator is able to supply an electric power demanded by the consuming device.

2. Method according to claim 1, wherein the additional consuming device is not supplied with electric power by the generator when the charging current is lower than the limit value.

3. Method according to claim 1, wherein the charging current is controlled to the limit value when the additional consuming device is supplied with power by the generator.

4. Method according to claim 1, wherein the limit value of the charging current is changed as a function of at least one variable, particularly as a function of the vehicle battery temperature or of the battery charging condition.

5. Method according to claim 1, wherein a charging condition of the vehicle battery is detected and wherein it is permitted that the charging current falls under the limit value when a supply demand of the additional consuming device exists and when the charging condition is higher than or at least equal to a defined minimal value.

6. System for controlling the charging of a vehicle battery, having a control element for adjusting a charging current, by means of which a generator charges the vehicle battery (1), a detection device for detecting whether the charging current exceeds a limit value, and a control unit which is connected with the detection device and the control element and which has a connection for receiving a demand signal which signals an electric supply demand of an additional consuming device connected to the generator, wherein the system is further developed such that, in the case of a supply demand of the additional consuming device, the charging current can be adjusted such by the control element that it is lower than the maximally possible charging current while the generator power and the power demand of other consuming device connected to the generator are the same.

7. System according to claim 6, having
a detection device for detecting the charging condition of the vehicle battery, wherein said detection device is connected to the vehicle battery and to the control unit,
wherein the control unit is further developed such that it controls the charging of the vehicle battery as a function of a detection signal of the detection device.

8. A method of controlling a charging of a battery in a vehicle including a generator for charging the battery and for supplying electric power to a consuming device and an additional consuming device, the method comprising:
supplying electric power to the additional consuming device by the generator only when the electric power supplied to the consuming device is at or above an electric power threshold; and
controlling the supplying of electric power to the additional consuming device and the charging of the vehicle battery if:
the power demand of the additional consuming device is below a power threshold;
it is determined that a charging current, which flows from the generator into the battery, is higher than a limit value; and
the generator power additionally permits the supplying of the additional consuming device.

9. The method according to claim 8, wherein the additional consuming device is supplied with power by the generator and the charging current is adjusted such that it is lower than a current threshold.

10. Method according to claim 8, wherein the additional consuming device is not supplied with electric power by the generator when the charging current is lower than the limit value.

11. Method according to claim 8, wherein the charging current is controlled to the limit value when the additional consuming device is supplied with power by the generator.

12. Method according to claim 8, wherein the limit value of the charging current is changed as a function of at least one variable, particularly as a function of the vehicle battery temperature or of the battery charging condition.

13. Method according to claim 8, wherein a charging condition of the vehicle battery is detected and wherein it is permitted that the charging current falls under the limit value when a supply demand of the additional consuming device exists and when the charging condition is higher than or at least equal to a defined minimal value.

14. In a system comprising a generator coupled to a vehicle battery, a first consuming device, and a second consuming device, a method of charging said vehicle battery comprising:
supplying power to said second consuming device by said generator if said generator is able to supply a demanded power to said first consuming device; and
controlling a charging current to said vehicle battery if:
said power supplied to said second consuming device is below a demanded power of said second consuming device;
said charging current is above a lower charging current threshold; and
said generator is able to supply said power to said second consuming device;
wherein controlling said charging current comprises adjusting said charging current such that said charging current is lower than an upper charging current threshold.

15. The method of claim 14, further comprising ceasing said supplying power to said second consuming device by said generator if said charging current falls below said lower charging current threshold.

16. The method of claim 14, further comprising adjusting said charging current to said lower charging current threshold while said generator is supplying said power to said second consuming device.

17. The method of claim 14, wherein said lower charging current threshold is dependent on a temperature of said battery vehicle.

18. The method of claim 14, wherein said lower charging current threshold is dependent on a charging condition of said battery vehicle.

19. A system comprising:
a current controlling element for adjusting a charging current flowing from a generator to a vehicle battery;
a current sensing device for generating a current signal indicative of said charging current;
a consuming device capable of receiving power from said generator, wherein said consuming device generates a demand signal indicative of a power demanded by said consuming device; and
a control unit adapted to control said current controlling element in response to said current signal and said demand signal;
wherein said control unit is adapted to control said current controlling element such that said charging current is lower than an upper charging current threshold while said generator supplies said consuming device with said demanded power.

20. The system of claim 19, further comprising:
a charging condition detector for generating a charging condition signal indicative of a charging condition of said vehicle battery; and
wherein said control unit is adapted to control said current controlling element in response to said charging condition signal.

21. In a system comprising a generator coupled to a vehicle battery, a first consuming device, and a second consuming device, a method of controlling a charging of said vehicle battery comprising:
supplying a first electric power to said first consuming device by said generator;
supplying a second electric power to said second consuming device by said generator if said first electric power is at or above an electric power threshold; and
controlling said second electric power and a charging current flowing from said generator to said vehicle battery if:
said second electric power supplied to said second consuming device is below a demanded power of said second consuming device;
said charging current is above a lower charging current threshold; and
said generator is able to supply said second electric power to said second consuming device.

22. The method of claim 21, further comprising adjusting said charging current such that it is lower than said lower charging current threshold while said generator is supplying said second electric power to said second consuming device.

23. The method of claim 21, further comprising ceasing said supplying second electric power to said second consuming device by said generator if said charging current falls below said lower charging current threshold.

24. The method of claim 21, further comprising adjusting said charging current to said lower charging current threshold while said generator is supplying said second electric power to said second consuming device.

25. The method of claim 21, wherein said lower charging current threshold is dependent on a temperature of said battery vehicle.

26. The method of claim 21, wherein said lower charging current threshold is dependent on a charging condition of said battery vehicle.

27. The method of claim 21, further comprising:
detecting a charging condition of said vehicle battery; and
permitting that said charging current fall below said lower charging current threshold when said charging condition of said vehicle battery is at or above a charging condition threshold.

* * * * *